(12) United States Patent
Nakajima

(10) Patent No.: US 8,142,028 B2
(45) Date of Patent: Mar. 27, 2012

(54) PROJECTION TYPE DISPLAY DEVICE

(75) Inventor: Yoshinobu Nakajima, Kyoto (JP)

(73) Assignee: Panasonic Corporation, Osaka (JP)

( * ) Notice: Subject to any disclaimer, the term of this patent is extended or adjusted under 35 U.S.C. 154(b) by 297 days.

(21) Appl. No.: 12/684,366

(22) Filed: Jan. 8, 2010

(65) Prior Publication Data

US 2010/0177282 A1   Jul. 15, 2010

(30) Foreign Application Priority Data

Jan. 14, 2009   (JP) ................................ 2009-005480

(51) Int. Cl.
*G03B 21/16*   (2006.01)
(52) U.S. Cl. ............................... 353/58; 353/94; 353/70
(58) Field of Classification Search .................... 353/69, 353/70, 52, 57, 58, 60, 61, 94; 362/227, 362/234; 349/5–9
See application file for complete search history.

(56) References Cited

U.S. PATENT DOCUMENTS

| | | | |
|---|---|---|---|
| 6,224,217 B1 | 5/2001 | Tanaka | |
| 7,628,494 B2 * | 12/2009 | Akiyama | 353/94 |
| 7,824,038 B2 * | 11/2010 | Yun et al. | 353/58 |
| 7,901,085 B2 * | 3/2011 | Chen et al. | 353/61 |
| 2002/0048172 A1 | 4/2002 | Wada et al. | |

FOREIGN PATENT DOCUMENTS

| | | |
|---|---|---|
| JP | 10-106307 A | 4/1998 |
| JP | 2000-003612 A | 1/2000 |
| JP | 2000-171901 A | 6/2000 |
| JP | 3581568 B2 | 7/2004 |

* cited by examiner

*Primary Examiner* — William C Dowling
(74) *Attorney, Agent, or Firm* — Hamre, Schumann, Mueller & Larson, P.C.

(57) ABSTRACT

A projection type display device including: a plurality of light sources; a display device; a light-combining unit for combining output light beams from the plurality of light sources; a condensing unit for propagating an output light beam from the light-combining unit to the display device; a projecting unit for projecting an image with the use of an output light beam from the display device; and a cooling unit having a ventilating fan and disposed on each of the plurality of light sources. The projection type display device further includes a flow direction adjusting unit for switching blow-off positions where air from the fan is discharged and a control unit for controlling switching of the blow-off positions operated by the flow direction adjusting unit. The control unit controls the flow direction adjusting unit to switch the blow-off positions on the basis of posture information on at least one of an inclination angle of an optical axis of the plurality of light sources and a rotation angle about the optical axis. In a configuration using a plurality of light sources, reliable control of temperature management of the light sources is performed and problems, such as whitening of the light sources, life property degradation, blacking and brightness degradation are suppressed.

8 Claims, 21 Drawing Sheets

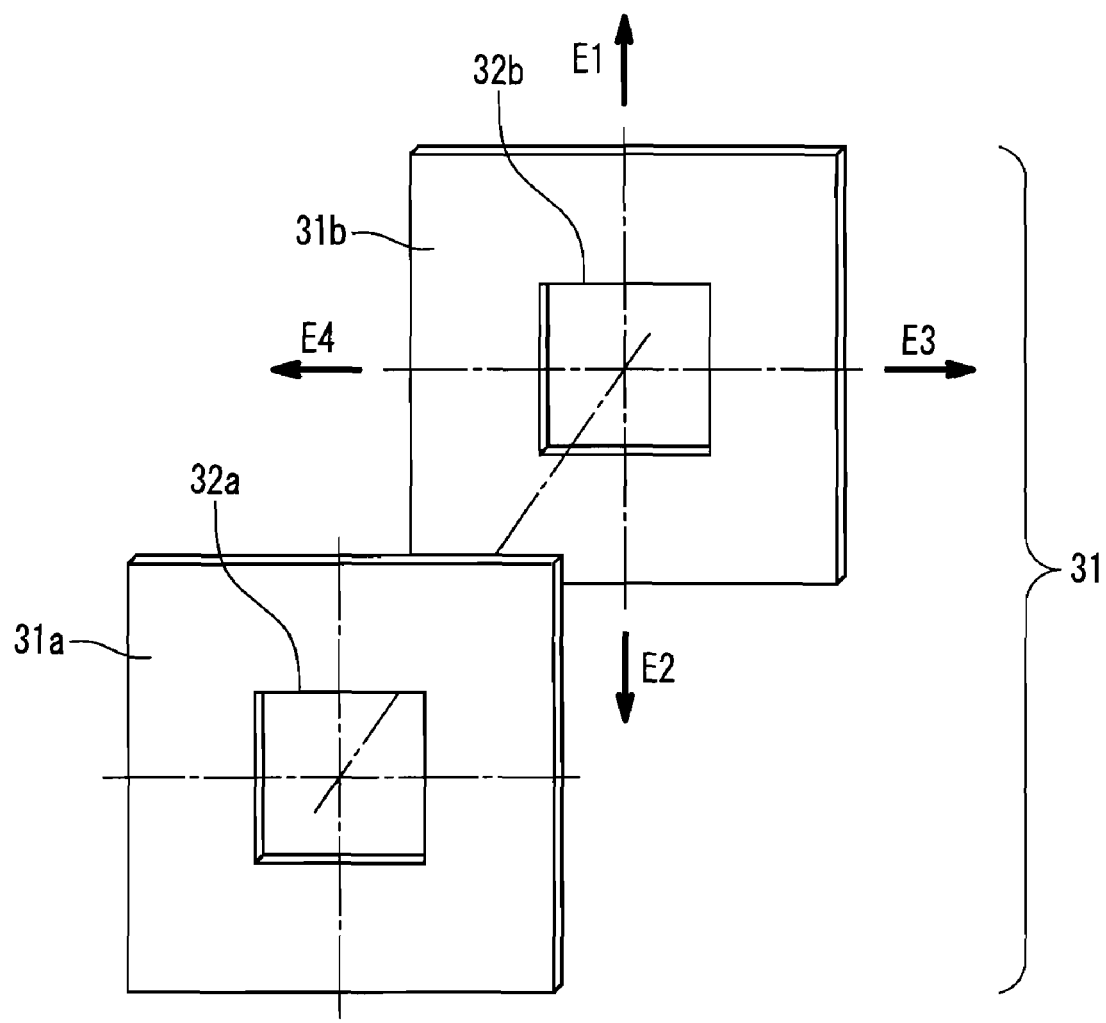
F I G. 15A

PROJECTION TYPE DISPLAY DEVICE

BACKGROUND OF THE INVENTION

1. Field of the Invention

The present invention relates to projection type display devices such as a projector, and particularly to a projection type display device using a plurality of light sources and provided with a cooling system that can cool the light sources adequately.

2. Description of Related Art

A projection type display device such as a projector has been known as a device for obtaining an image on a big screen. The projection type display device modulates light from a light source lamp with a video signal so as to form an optical image and radiates, by using an image display device such as DMD (Digital Micromirror Device) or a liquid crystal, thereby projecting the optical image in a magnified manner on the screen by the use of a projection lens.

The light source lamp is filled with mercury, a rare gas, a metal halide and the like. When a predetermined voltage is applied to the electrode in the light source lamp, a discharge arc occurs and the filler gas inside the lamp is convected. The discharge arc is curved to form an arc due to the convection of the filling gas, approaches the top of the light source lamp, and thus the temperature of the light source lamp rises. If the temperature of the light source lamp rises extremely, problems such as whitening and life property degradation will occur. To the contrary, when the temperature of the light source lamp is extremely low, it causes problems such as blacking and degradation in the brightness of the light source. Therefore, temperature management of the light source has a great influence on the quality and reliability of the projection type display device.

In particular, for a device that uses a plurality of light sources for the purpose of providing a projected image with high brightness (see JP 3581568 and JP 2000-171901 A for example), temperature management of the light source is important. Namely, a device that uses a plurality of light sources has an advantage in that even when any one of the light sources has a problem that causes a failure in lighting, the image projection will not be discontinued if the remaining light source is kept lightened. On the other hand, the conditions for lighting the light sources will be complicated. In such a case, it is particularly important to manage the temperature of light sources in relation to the direction in which the device is installed. With regard to this, however, conventionally, there has been only a disclosure of an investigation of the efficiency of a cooling fan concerning a device provided with a single light source installed in certain limited directions (see JP H10-106307 A for example).

However, as the uses of projection type display devices including a plurality of light sources have increased, the installation conditions have become diversified, and as a result, there is a high possibility that the devices are installed in a variety of postures. Light source lamps need to be maintained within a predetermined temperature range (e.g., 900° C. to 1,150° C.) in order to ensure their performance, and in recent years, appropriate temperature management of the light sources conforming to a variety of installation conditions has been required. Particularly, when light source lamps generate heat, the temperature inside the light source unit on the upper side (direction opposite to gravity) rises due to the convection of air. Consequently, the temperature distribution inside the light source unit changes in a variety of ways as a result of variations in the installation posture of the device. Therefore, it is not possible to handle the change in the temperature distribution inside the light source unit by uniformly supplying cool air to the light sources unit from a cooling fan through certain air outlets, so that the cooling efficiency declines. As a result, maintaining the temperature of the light sources within a desired range becomes difficult and the possibility of a breakdown increases. To prevent this problem, it is necessary to increase the scale of the cooling system, which results in an increase in the size of the device and in a problem in terms of cost.

SUMMARY OF THE INVENTION

Therefore, with the foregoing in mind, it is an object of the present invention to provide a projection type display device using a plurality of light sources that is capable of performing reliable and effective control of temperature management of the light sources so as to suppress problems, such as whitening of the light sources, life property degradation, blacking and brightness degradation, thereby providing a multipurpose projection type display device with high quality and reliability.

In order to achieve the above-mentioned object, the projection type display device of the present invention includes, as a basic configuration, a plurality of light sources; a display device; a light-combining unit for combining output light beams from the plurality of light sources; a condensing unit for transmitting an output light beam from the light-combining unit to the display device; a projecting unit for projecting an image with the use of an output light beam from the display device; and a cooling unit having a ventilating fan and disposed on each of the plurality of light sources. The projection type display device further includes a flow direction adjusting unit for switching blow-off positions where air from the fan is discharged, and a control unit for controlling switching of the blow-off positions by the flow direction adjusting unit. The control unit controls the flow direction adjusting unit to switch the blow-off positions on the basis of posture information on at least one of an inclination angle of an optical axis of the plurality of light sources and a rotation angle about the optical axis.

According to the configuration of the present invention, even when the projection type display device is used in a variety of installation postures relative to the inclination angle of the optical axis of the plurality of light sources and the rotation angle about the optical axis, the blow-off positions where air from the fan is discharged can be switched adequately. As a result, highly accurate and reliable control of temperature management inside the light source unit becomes possible, so that problems, such as whitening of the light sources, life property degradation, blacking and brightness degradation can be suppressed, thereby providing a multipurpose projection type display device with high quality and reliability.

BRIEF DESCRIPTION OF THE DRAWINGS

FIG. 3A is a front view, FIG. 3B is a plan view and FIG. 3C is a side view.

FIG. 15A is a perspective view showing main components of yet another example of the cooling control mechanism for the light sources of the projection type display device.

DETAILED DESCRIPTION OF THE INVENTION

The projection type display device of the present invention, having the basic configuration as described above, can be configured as follows.

That is, the plurality of light sources may include at least a pair of opposing light sources that share the optical axis, and the control unit may control the flow direction adjusting unit disposed on the opposing light sources to switch the blow-off positions on the basis of the posture information on at least one of the inclination angle of the optical axis of the opposing light sources and the rotation angle about the optical axis. By having such a configuration, when at least a pair of opposing light sources that share an optical axis is applied to the plurality of light sources, adequate temperature control can be performed and a compact and efficient projection type display device can be achieved.

Further, the projection type display device may include a posture detecting unit for detecting at least one of the inclination angle of the optical axis of the plurality of light sources and the rotation angle about the optical axis, and the control unit may switch the blow-off positions on the basis of information outputted from the posture detecting unit. As a result, accurate and reliable control can be achieved efficiently on the basis of an output of the detecting unit that detected at least one of the inclination angle of the optical axis of the plurality of light sources and the rotation angle about the optical axis.

Further, the posture detecting unit may detect at least one of the inclination angle of the optical axis and the rotation angle about the optical axis according to four steps classified by levels of 0, 90°, 180° and 270°. As a result, by switching the blow-off positions with the angle being detected according to four steps, a device with practical functions can be achieved with the use of a simplified configuration.

Further, the flow direction adjusting unit may be provided on an air outlet through which air from the fan is discharged and may be composed of a shutter that can switch a plurality of openings having different blow-off positions from each other. As a result, the flow direction adjusting unit is composed of a shutter with a simple structure, and it is possible to handle the change in the temperature distribution inside the light source unit promptly and reliably.

Further, the shutter may be configured in such a manner that the openings are switched by displacement of sliding members. Further, the shutter may be composed of a rotatable disc.

Further, the blow-off positions respectively disposed on the pair of opposing light sources may be switched at the same time by the shutter. As a result, the configuration can be simplified.

Hereinafter, an embodiment of the present invention will be described with reference to the drawings.

Embodiment

Figure 1:
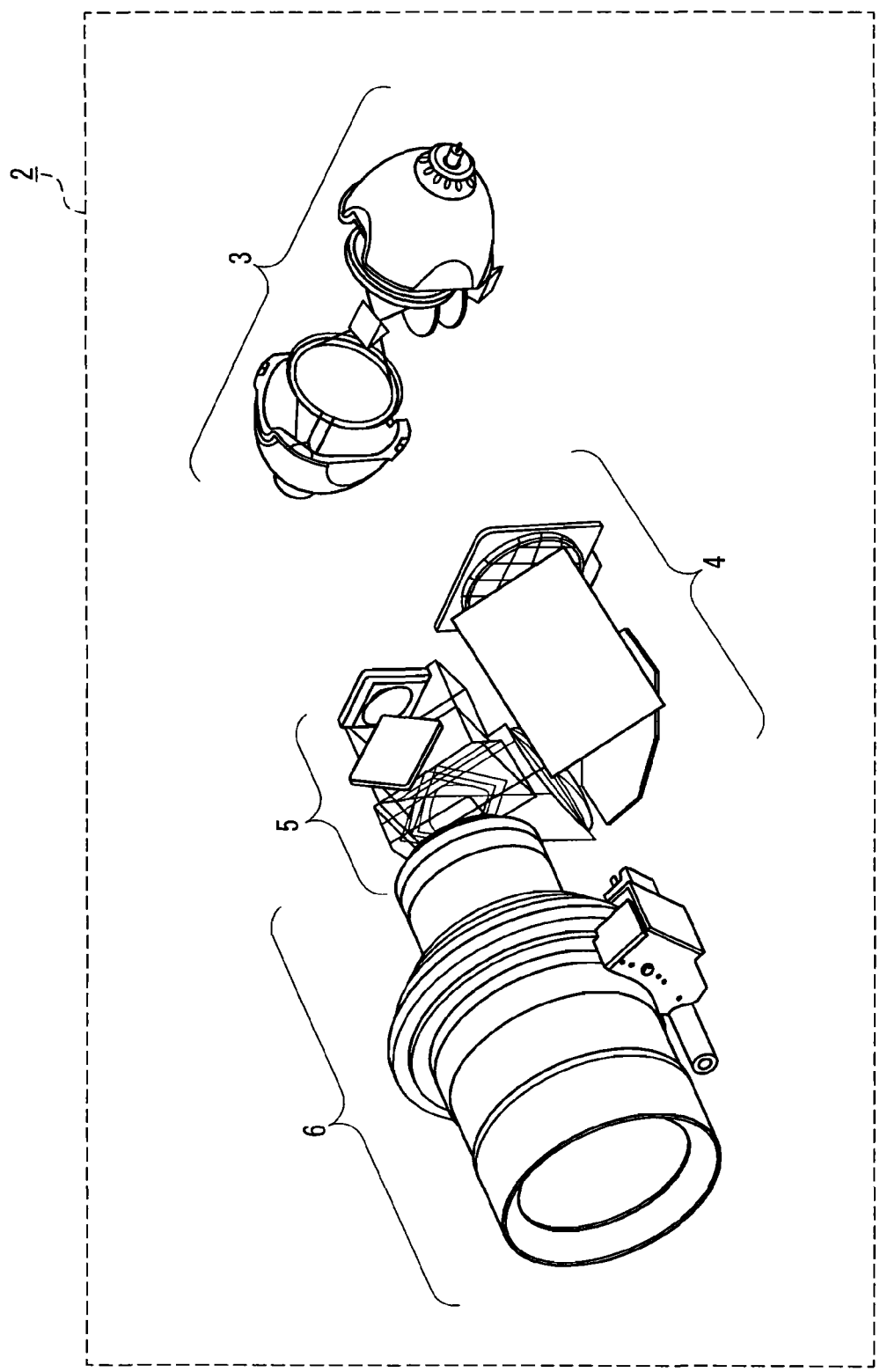
FIG. 1 is a perspective view showing configurations of the main components of a projection type display device according to an embodiment of the present invention.
Figure 2:
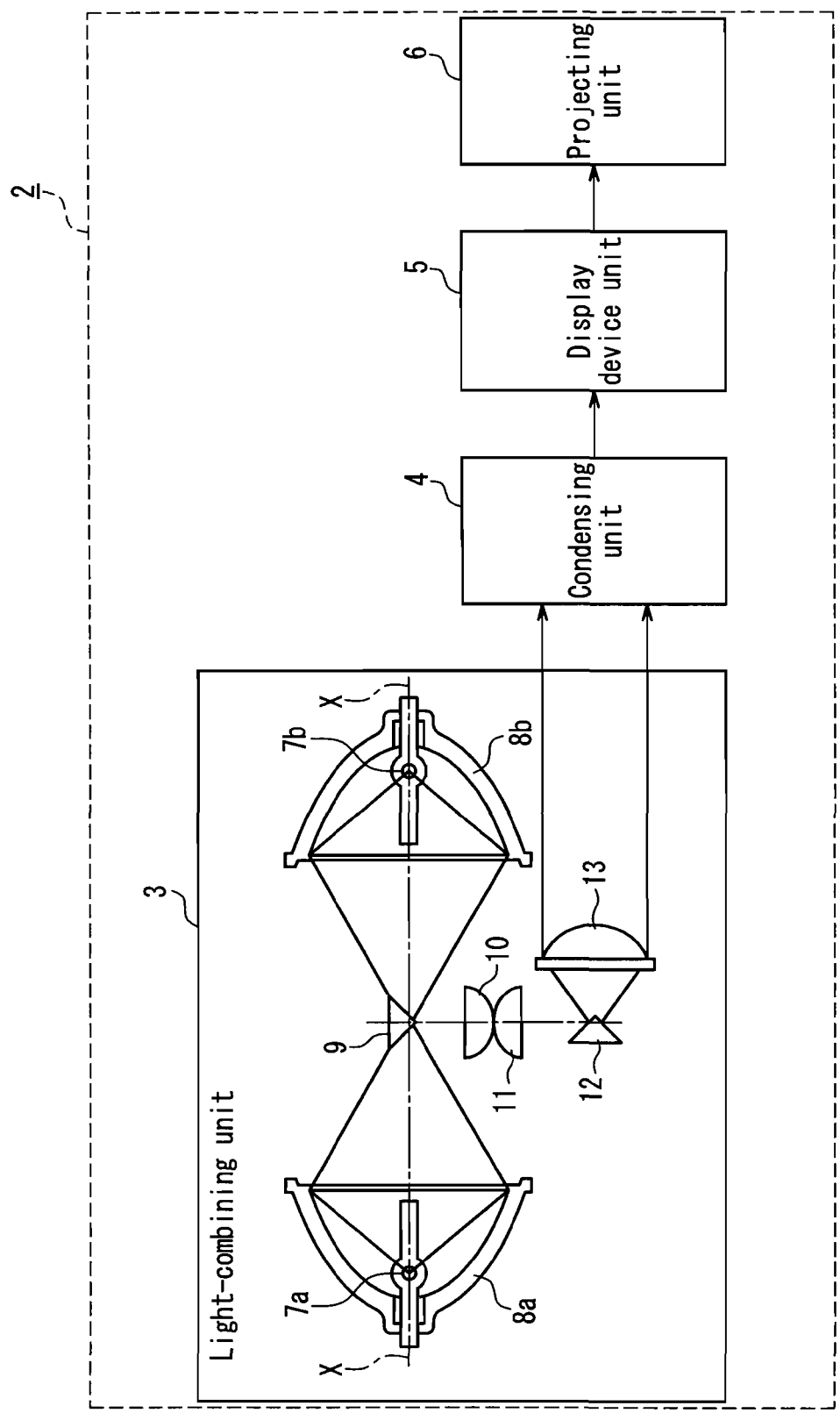
FIG. 2 is a configuration diagram including a cross-sectional structure of part of a light-combining unit of the projection type display device.

First, an optical system forming the projection type display device (hereinafter abbreviated as the device) according to an embodiment of the present invention will be described with reference to FIGS. 1 and 2. FIG. 1 is a perspective view showing a schematic configuration of the optical system 2 of the device. FIG. 2 is a diagram showing a basic configuration of a light-combining unit 3 for combining two light beams in the optical system 2.

The optical system 2 includes the light-combining unit 3, a condensing unit 4, a display device unit 5 and a projecting unit 6. As shown in FIG. 2, the light-combining unit 3 combines output light beams from two light source lamps 7a and 7b. Output light from the light-combining unit 3 is propagated to the display device 5 by the condensing unit 4. The display device unit 5 is composed of an image display device such as DMD (Digital Micromirror Device). The projecting unit 6 projects an image by the use of output light from the display device unit 5.

The two light source lamps 7a and 7b are disposed respectively on the interiors of the concave mirrors 8a and 8b each having an elliptical cross section and the light source lamps oppose each other so as to share an optical axis. Extra-high pressure mercury lamps may be used for the light source lamps 7a and 7b. On the inner surface of a glass member of the concave mirrors 8a and 8b, dielectric optical multilayer films are formed for transmitting infrared light and reflecting visible light. Furthermore, a combining prism 9, condensing lenses 10 and 11, combining prism 12 and a condensing lens 13 are disposed on the interior of the light-combining unit 3.

Hereinafter, major functions of the optical system 2 will be described. Output light beams from the light source lamp 7a and the light source lamp 7b are condensed respectively by the convex mirrors 8a and 8b, so that a light image is formed on a mirror surface of the combining prism 9 and is reflected towards the condensing lens 10.

Light beam reflected by the combining prisms 9a is once diverged and then passes through the condensing lenses 10 and 11 so as to be converged and reflected again as divergent light on the mirror surface of the combining prism 12, which reaches the condensing unit 4 through the condensing lens 13.

The combining prisms 9 and 12 are triangular prisms whose cross sections are isosceles triangles, and a dielectric multilayer film mirror is formed on each of light incidence surfaces by laminating alternately a low-refractive index material and a high refractive index material. Since the output light beams from the light source lamps 7a and 7d are condensed on a minute area, a material having excellent heat resistance and UV resistance is used for the multilayer film for forming the mirror surface.

The condensing unit 4 includes a condensing lens (not shown), a mirror (not shown) and the like, and adjusts the traveling path of the output light from the light-combining unit 3 to be propagated to the display device unit 5.

The display device unit 5 includes a total reflection prism (not shown) and a reflection light bulb (not shown) as an image display device, and forms an image to be projected. When the reflection light bulb is DMD, mirror elements are arranged in a matrix for each pixel, and modulate the traveling direction of the light in accordance with the video signal so as to form an optical image as a change in the reflection angle.

An optical image formed by the display device unit 5 is outputted to the projecting unit 6, and projected on a screen (not shown) by a projection lens of the projecting unit 6.

Though a reflection type light bulb that modulates the traveling direction of light is used as the light bulb in the present embodiment, the configuration is not limited thereto. Similar effects can be obtained even by using a light bulb of a type that modulates the polarization direction or scattering state of light or a transmission type light bulb and applying a similar configuration.

Figure 3A:
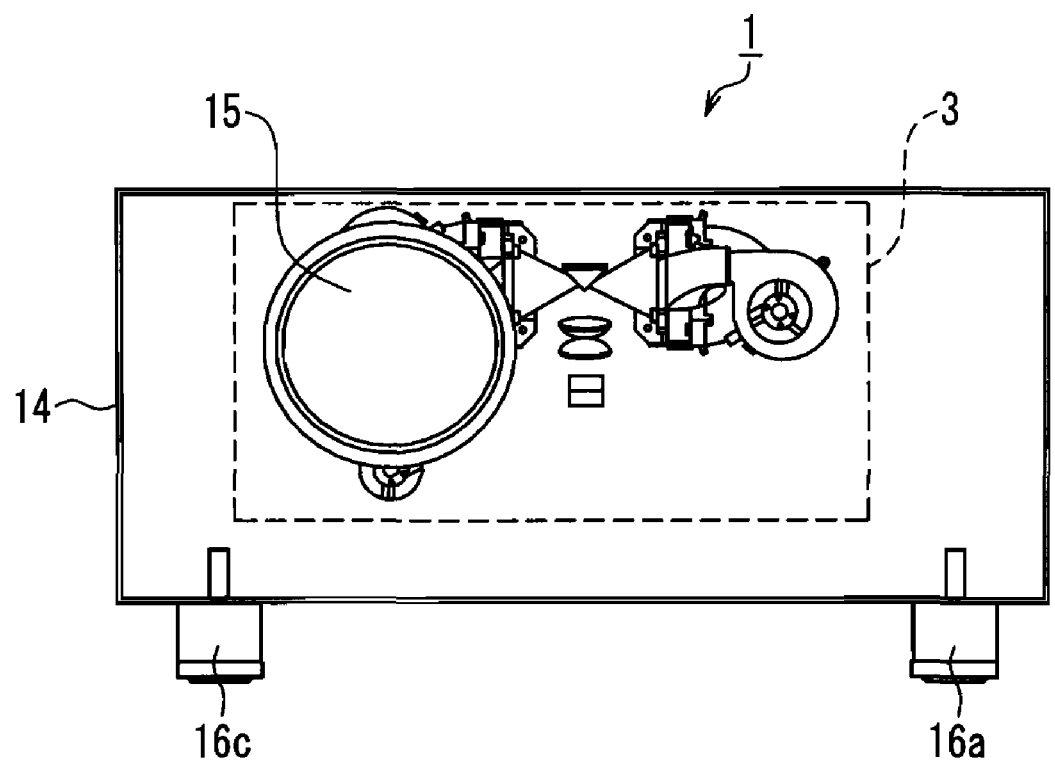
FIGS. 3A to 3C are diagrams showing layouts of main components that form an optical system of the projection type display device.
Figure 3B:
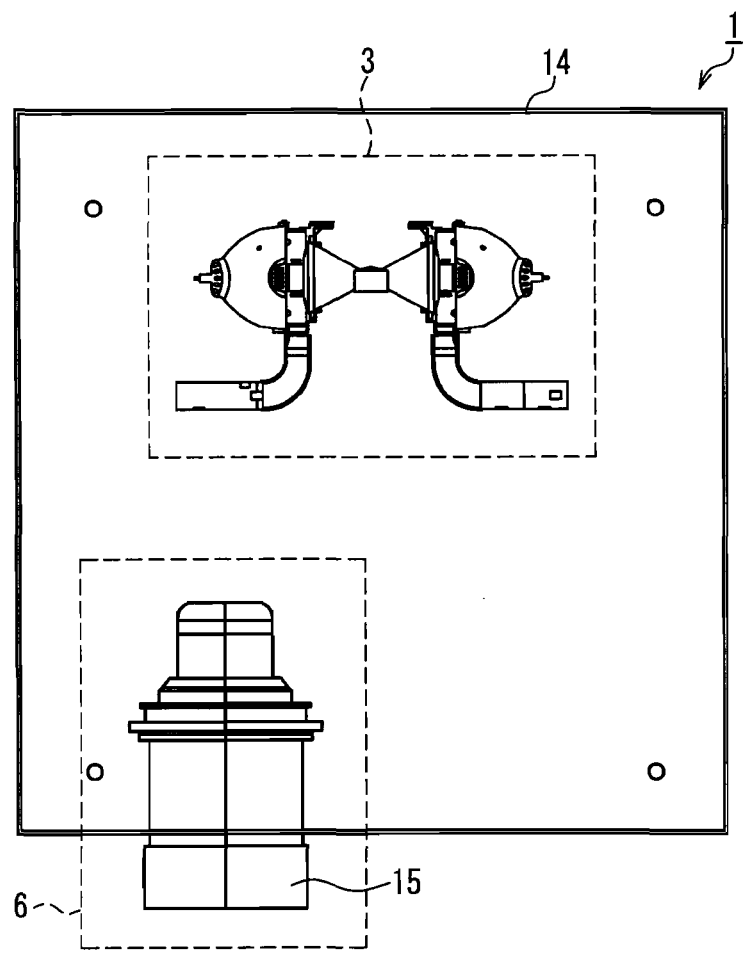
Figure 3C:
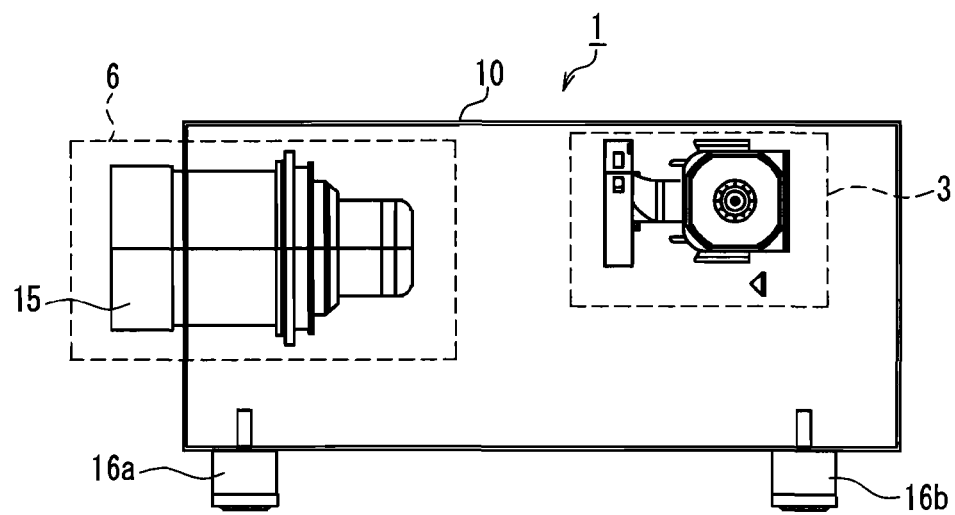

Next, the schematic configuration of the device 1 will be described. FIGS. 3A to 3C show layouts of main mechanism elements forming the optical system 2 mounted on the device 1; FIG. 3A is the front view; FIG. 3B is the plan view; and FIG. 3C is the side view. FIGS. 4A to 4D are views for showing installation postures of the device 1.

In the device 1, the light-combining unit 3 and the projecting unit 6 as the main units for forming the optical system 2 are arranged inside a cabinet 14 as shown in FIGS. 3A to 3C. A projection lens 15 at the end of the projecting unit 6 protrudes from the cabinet 14. 16a to 16c denote legs provided on the cabinet 14.

Figure 4A:
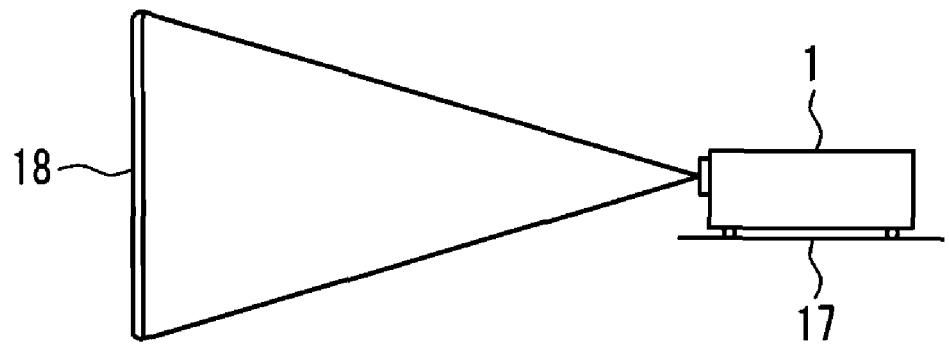
FIGS. 4A to 4D are diagrams showing four kinds of installation postures of the projection type display device.
Figure 4B:
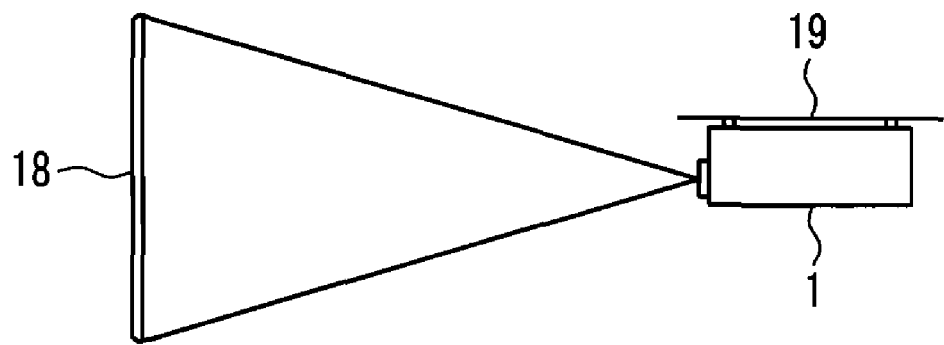
Figure 4C:
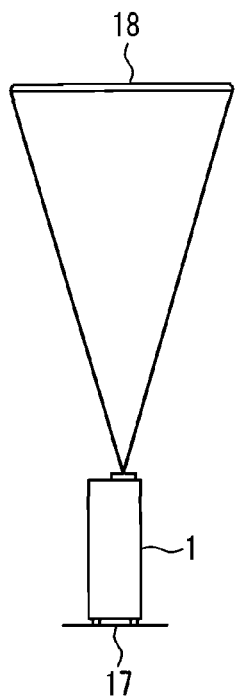
Figure 4D:
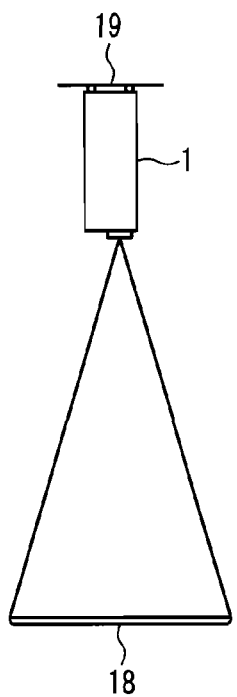

As shown in FIG. 4A, generally, the device 1 is mounted on a support table 17 and used in a form of projecting on a screen 18 in a horizontal installation posture. However, it is also possible to project a display image in a state attached to the ceiling 19 as shown in FIG. 4B (ceiling-hung posture), or arranged vertically facing right above or right below (upward posture and downward posture) as shown in FIGS. 4C and 4D.

Figure 5:
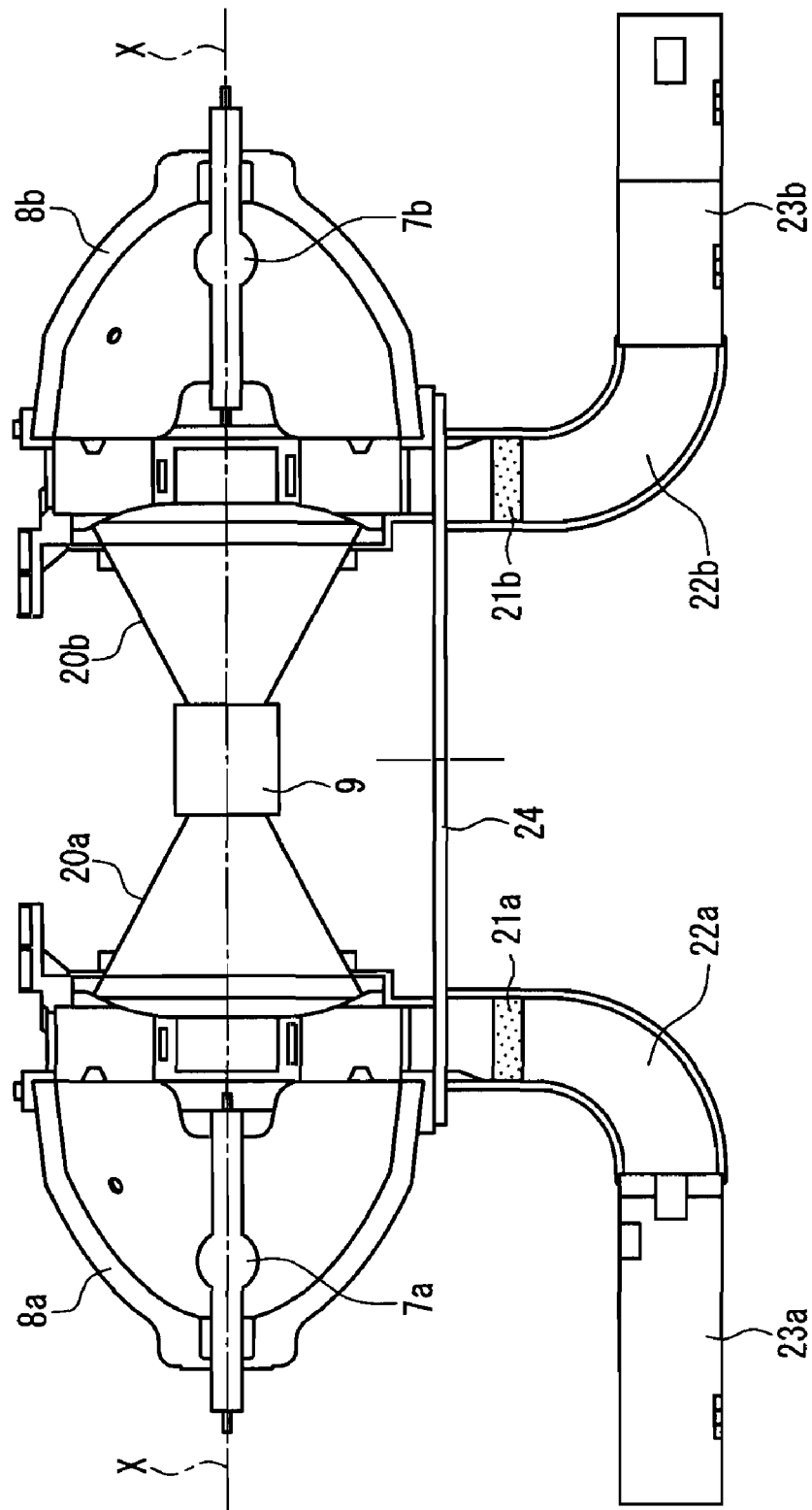
FIG. 5 is an enlarged cross-sectional view showing the light-combining unit in the optical system of the projection type display device.
Figure 6:
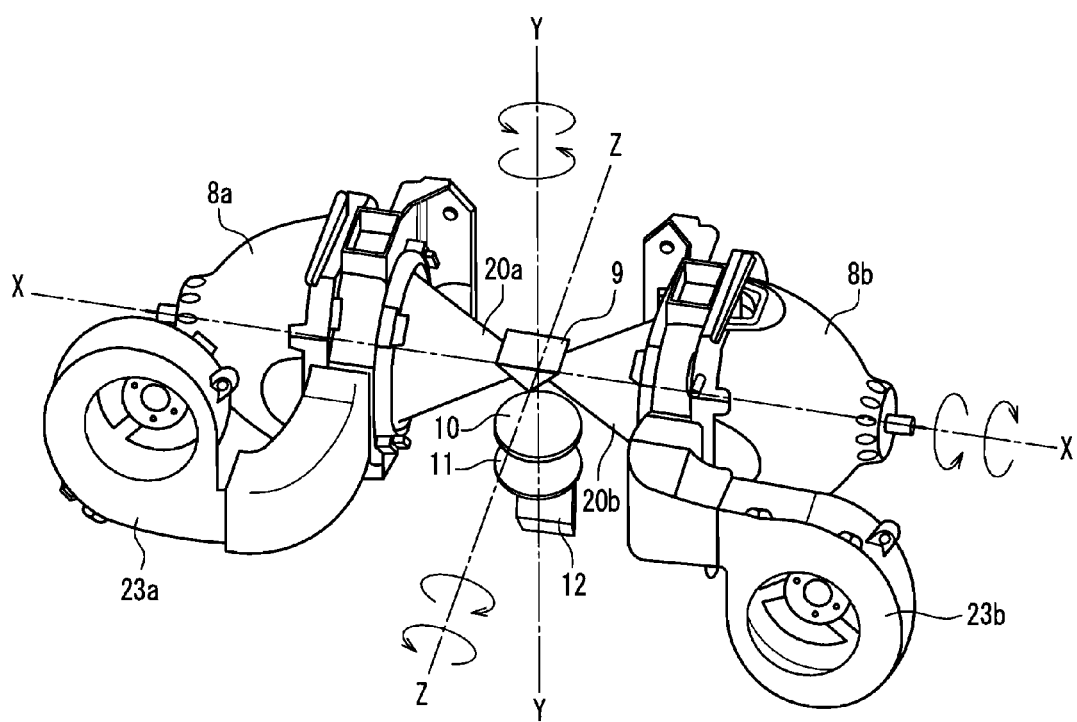
FIG. 6 is a perspective view showing some parts of the light-combining unit of the projection type display device shown in FIG. 5.

FIGS. 5 and 6 show the mutual relationship between the two opposing light source lamps 7a and 7b, and a structural example of a cooling unit disposed on the light source lamps 7a and 7b. FIG. 5 is a plan view showing the light-combining unit 3 in the optical system of FIG. 3B partially in enlarged cross-section. FIG. 6 is a perspective view showing the structure of the light-combining unit 3 of FIG. 5 with some parts being removed.

The light source lamps 7a and 7b respectively are disposed on the interiors of the concave mirrors 8a and 8b so as to share an optical axis XX (their optical axes match with each other). Light guides 20a and 2b respectively are disposed between the combining prism 9 and the concave mirror 8a and between the combining prism 9 and the concave mirror 8a. To the light source lamp 7a, a centrifugal fan (hereinafter abbreviated as cooling fan) 23a is connected via an air duct 22a including an air volume control valve 21a. Similarly, to the light source lamp 7b, a cooling fan 23b is connected via an air duct 22b inducting an air volume control valve 21b.

The device 1 includes a shutter 24 disposed on side portions of the pair of opposing light source lamps 7a and 7b. The shutter 24 functions as a blow-off control plate (flow direction adjusting unit) for controlling air blown in by the cooling fans 23a and 23b. Note that the shutter 24 is not shown in FIG. 6 so as to make the configuration of the optical unit 3a easier to understand.

As shown in FIG. 6, output light beams from the light source lamps 7a and 7b are reflected by the concave mirrors 8a and 8b and then pass through the interiors of the light guides 24a and 24b while sharing the optical axis XX (their optical axes match with each other). Further, the light beams are reflected again by the combining prism 9 and reach the combining prism 12 via the condensing lenses 10 and 11.

Figure 7A:
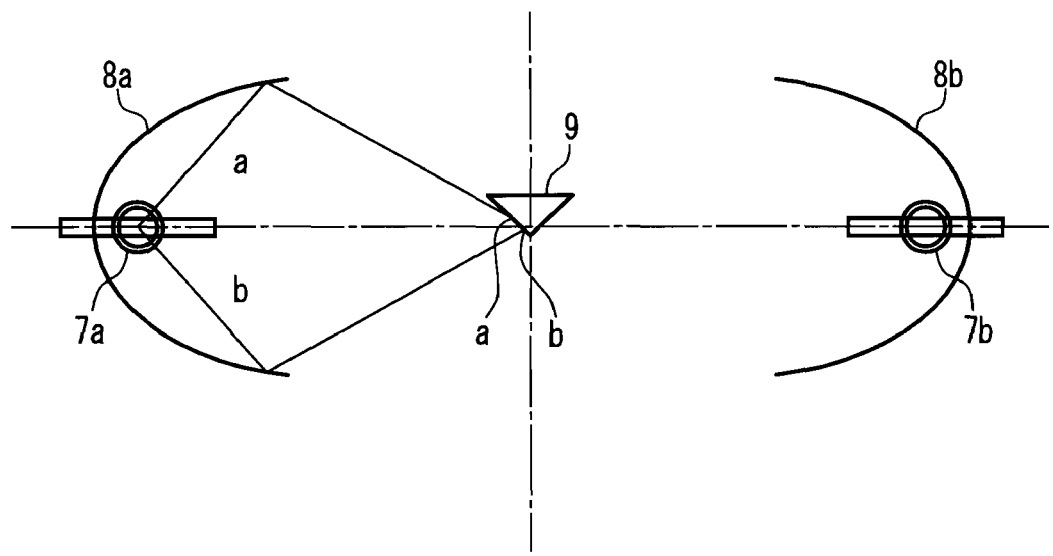
FIGS. 7A and 7B are schematic diagrams showing optical characteristics of the light-combining unit of the projection type display device.
Figure 7B:
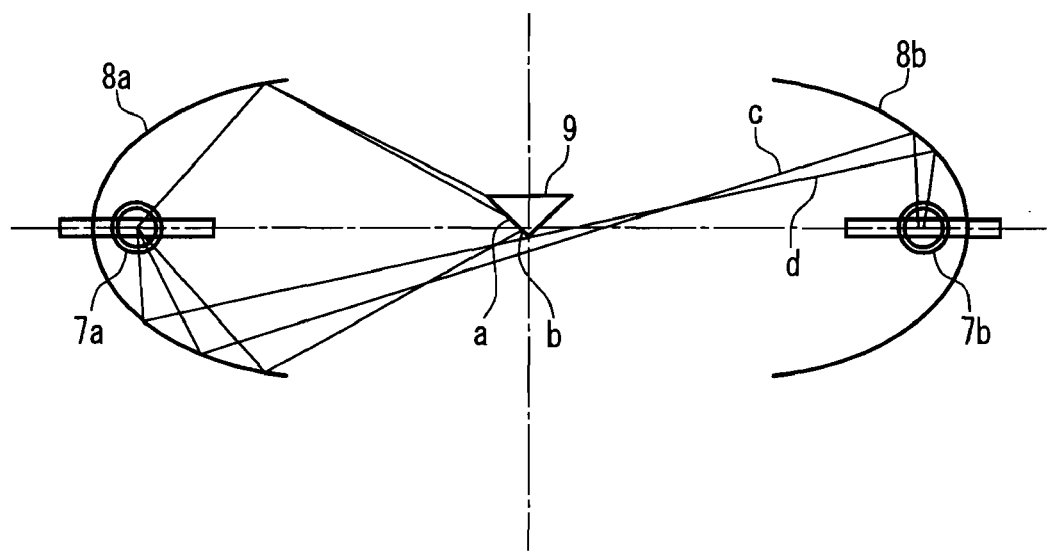

FIGS. 7A and 7B show the optical characteristics of output light when the light source lamps 7a and 7b of the device 1 are turned on. As shown in FIG. 7A, the output light from the light source lamp 7a is reflected on the concave mirror 8a and the combining prism 9 so as to form divergent light beams a and b that travel as effective light on optical paths. On the other hand, FIG. 7B shows existence of light fluxes c and d straying from the combining prism 9, other than the divergent light beams a and b. These light fluxes are reflected by the concave mirror 8b of the opposing light source lamp 7b and reaches the light source lamp 7b. As a result, when the light sources lamps 7a and 7b are turned on at the same time, the light sources will be irradiated mutually with a part of the output light, and thus the temperature of the light sources will rise further in comparison with a case where only one of the light sources is turned on.

As mentioned above, in a case of combining output light from a plurality of light sources and radiate the display device so as to project an image, it should be noted that there is an idle component that is scattered or radiates unwantedly, other than the effective component of output light combined and used as effective light. Specifically, in a system of combining output light from a plurality of light sources, the temperature of the light sources will rise excessively due to radiation from the opposing light sources, and it causes problems such as whitening of the light sources and life property degradation.

In order to solve this problem, cooling fans 23a and 23b are provided for the light source lamps 7a and 7b, respectively. Thus, the light source lamps can be cooled by blowing in air against the heat that is generated when the lamps are turned on. Further, by operating the air volume control valves 21a and 21b, the volume of air supplied from the cooling fans 23a and 23b can be adjusted adequately. Furthermore, a method of cooling the light source lamps with the use of the cooling fans (described later) as one of the features of the configuration of the present invention is used.

When the light source lamps generate heat, the temperature inside the light source unit on the upper side (direction opposite to gravity) becomes higher than on the lower side due to the convection of air. Consequently, the temperature distribution inside the light source unit changes in a variety of ways as a result of variations in the installation posture of the device. As for the device 1, an appropriate measure has been taken to handle such a change in the temperature distribution inside the light source unit. That is, since it is not possible to handle the change in the temperature distribution inside the light source unit by uniformly supplying cool air to the light sources from the cooling fans through certain air outlets, the cooling efficiency declines. Therefore, the device 1 employs a configuration that suppresses a decline in the cooling efficiency in response to a change in air convection conditions inside the light source unit resulting from variations in the installation posture of the device.

To set the conditions for ventilation by the cooling fans in an appropriate manner in response to a change in the installation direction about the axis XX, the axis YY or the axis ZZ in FIG. 6 as a rotation axis so that a decline in the cooling efficiency can be suppressed, the following points need to be considered. With regard to changes about the axis YY, air convection conditions that correspond to a flow in the vertical direction do not change. Further, the conditions for the upward and downward directions set by a rotation about the optical axis XX are the same as those for the upward and downward directions set by a rotation about the axis ZZ. On the basis of this, in the present embodiment, measures are taken against four directions about the optical axis XX (when the rotation angle is 0°, 90°, 180° or 270°) and two directions about the axis ZZ (when the rotation angle is 90° or 270°) as will be described below.

Figure 8:
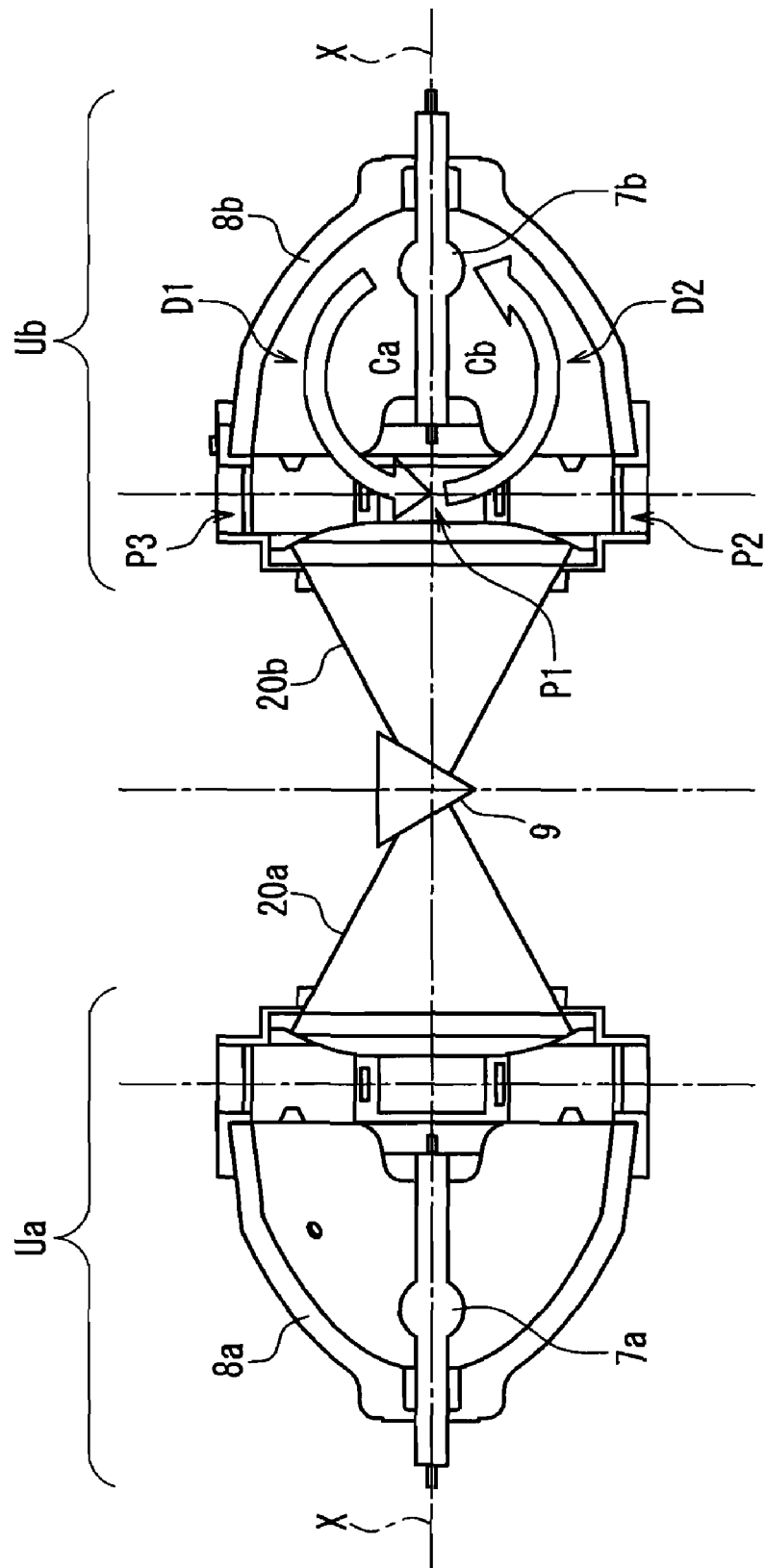
FIG. 8 is a cross-sectional view showing main components, for explaining a temperature distribution inside the light source unit of the projection type display device.

FIG. 8 is a cross-sectional view showing major components for explaining the temperature distribution inside the light source unit when the light source lamps in the light-combining unit 3 of FIG. 6 are turned on. In FIG. 8, for example, when the light source lamp 7b is turned on, the air inside the light source unit Ub is heated and air convections Ca and Cb develop. As a result, the temperature in the light source unit Ub on an upper side D1 becomes higher than on a lower side D2. Thus, when a cooling fan air outlet (a port through which cooling air is supplied to the light source unit) P1 is provided on the side portion of the light source unit Ub and air outlets P2 and P3 are provided at the top and bottom positions, the blow-off position of the cooling fan deviates from the high temperature position of the temperature distribution in the light source unit Ub, and as a result, the cooling efficiency declines.

Figure 9:
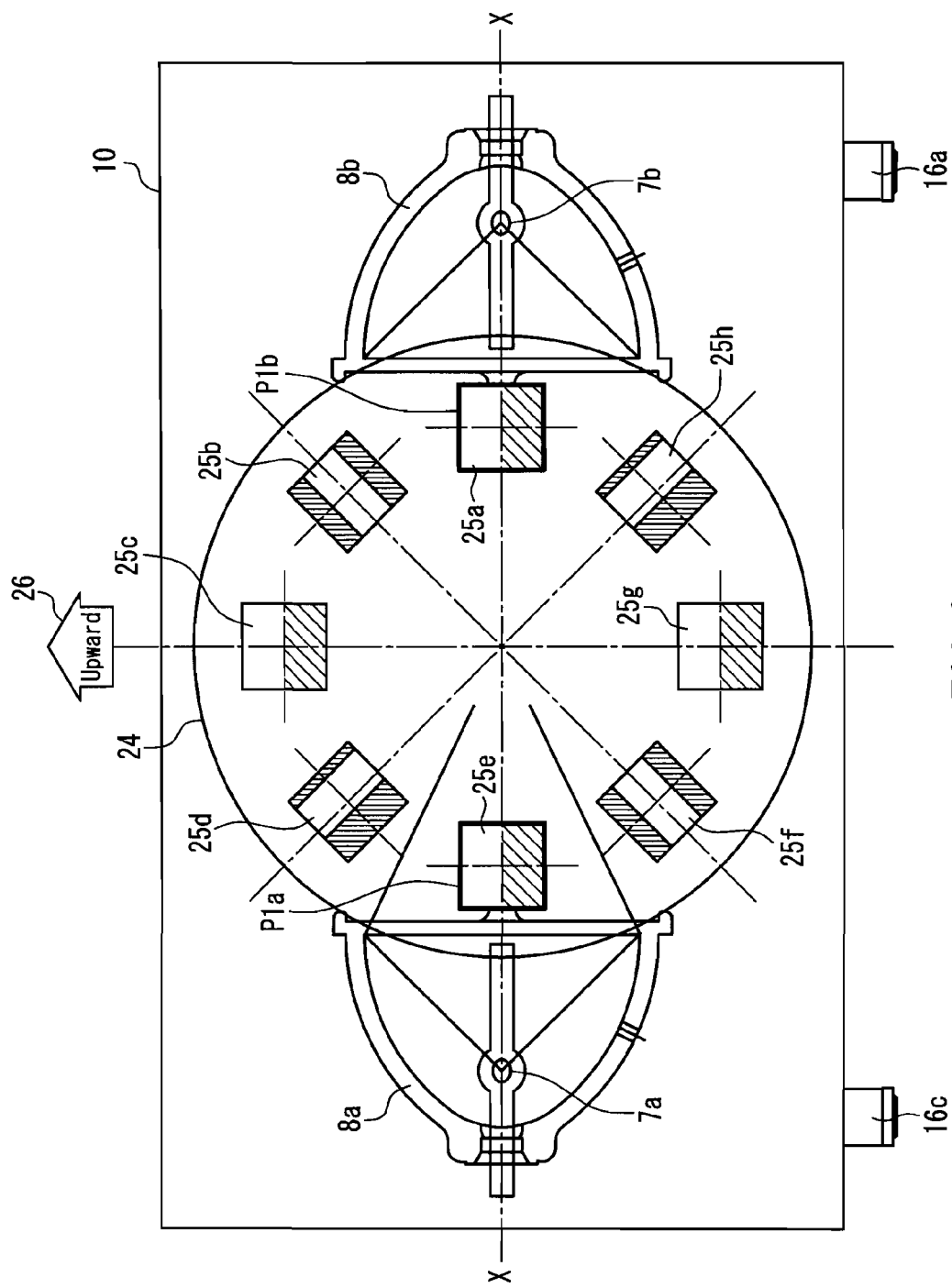
FIG. 9 is a front view showing partially in cross-section a general outline of a cooling control mechanism of the light sources of the projection type display device.

With respect to this, the device 1 includes the shutter 24 as shown in FIG. 5, so that air blown from the cooling fans 23a and 23b to the pair of opposing light source lamps 7a and 7b can be controlled. FIG. 9 is a side view showing the configuration of the shutter 24 of FIG. 5. In order to show layouts in the device 1, the cabinet 14 is also schematically shown. The shutter 24 is composed of a disc that is rotatable in eight steps of 45° and openings 25a to 25h are formed in the shutter 24 at every 45°. At each of the eight-step rotation angles, the openings 25a to 25h are areas that correspond to the cooling fan air outlet P1a and P1b provided respectively on the light source units Ua and Ub, and they have the same shape and size as those of the cooling fan air outlets. The openings are configured to have a size and shape with some part of each area being obstructed.

FIG. 9 shows a state in which the optical axis XX is horizontal, in other words, the device is in the floorstanding posture of FIG. 4A where the top surface of the cabinet 14 is facing an upward direction indicated by the arrow 26 and the shutter 24 is placed at the rotation angle corresponding to this posture. For example, the opening 25a opposes the air outlet P1b and the upper half functions as the opening and the lower half is obstructed. The openings 25c, 25e and 25g are also in a similar shape.

By blowing in cool air through the openings 25a and 25e in this state, it is possible to cool the high temperature portions located on the upper side of the light source units Ua and Ub intensively. As a result, the cooling efficiency can be increased. Further, by rotating the shutter 24 to bring the openings 25b and 25f or the openings 25d and 25h into opposition with the air outlets P1a and P1b, it is possible to move cool air blow-off positions vertically in the Y direction.

Next, rotation angle positions of the shutter 24 controlled in response to the installation posture of the device 1, in other words, the disposition of the openings 25a to 25h will be described with reference to FIGS. 10A to 12B. In each of the drawings, the light source lamps 7a and 7b are not shown and only the shutter 24 is shown. Further, the positions of the air outlets P1a and P1b are indicated by a thick line. The top surface side of the device 1 is indicated by the arrow 26.

Figure 10A:
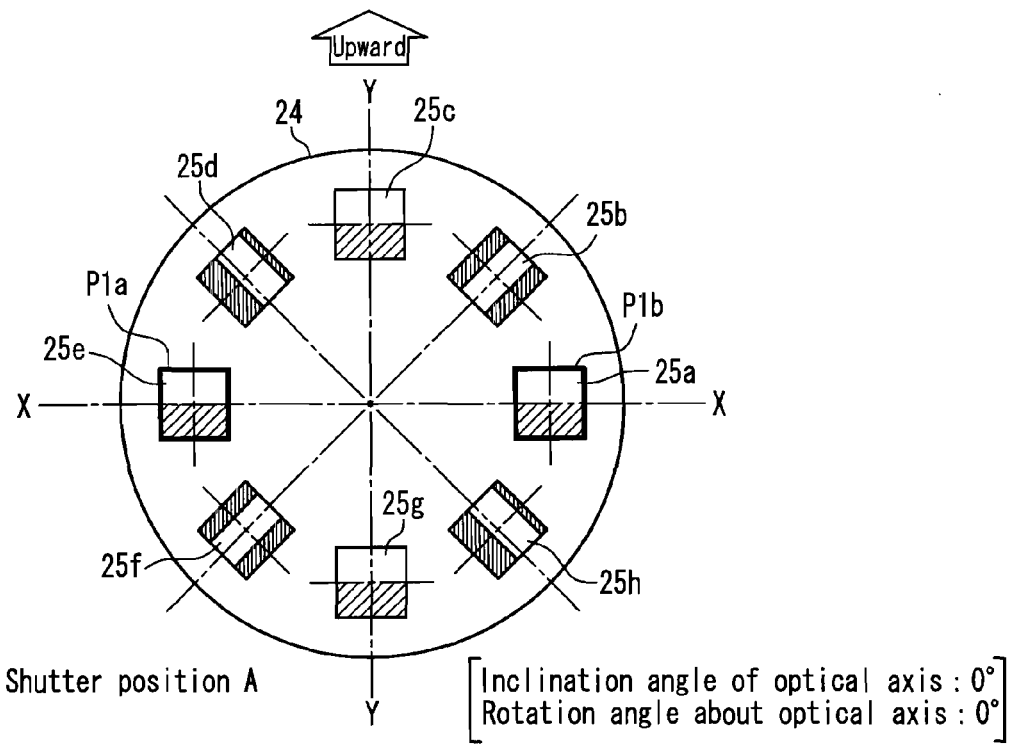
FIGS. 10A, 10B, 11A, 11B, 12A and 12B are front views each showing an example of controlling an angle position of a shutter that forms the cooling control mechanism.
Figure 10B:
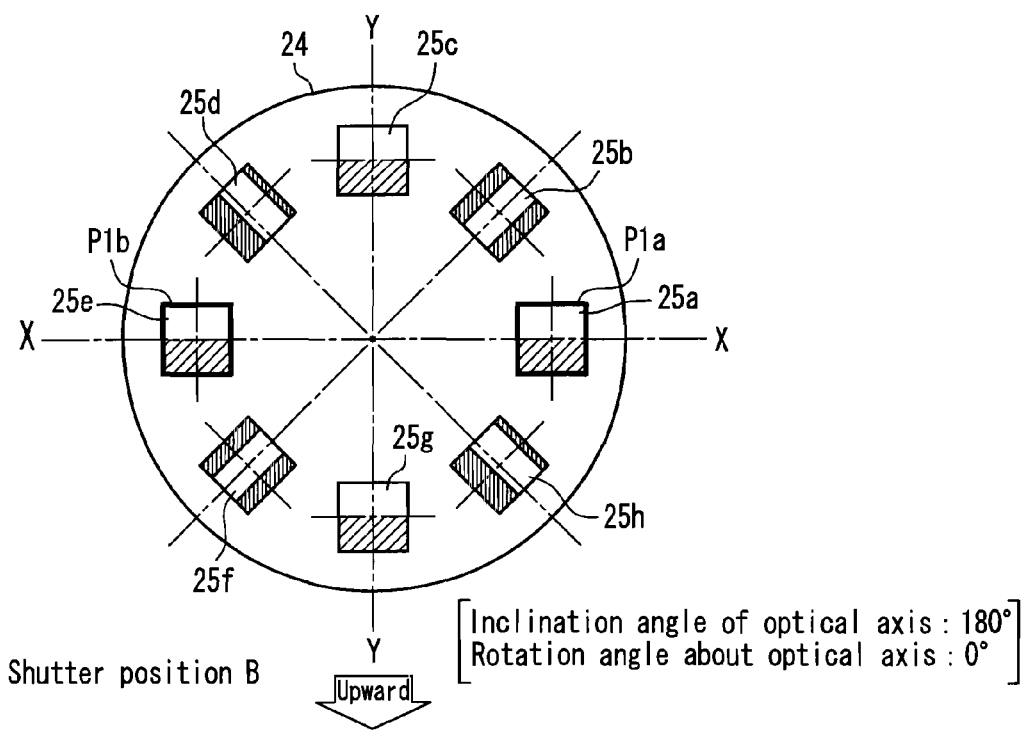

FIGS. 10A and 10B shows controlled angle positions of the shutter 24 when the air outlets P1a and P1b are in the XY plane (perpendicular plane) in FIG. 6 (when the rotation angle about the optical axis XX is 0°). FIG. 10A shows a shutter position A, which is applied when the inclination of the optical axis XX (rotation angle about the ZZ axis) of the light source lamps 7a and 7b is 0° (floorstanding posture of FIG. 4A). In this state, the openings 25e and 25a face the air outlets P1a and P1b, respectively. FIG. 10B shows a shutter position B, which is applied when the inclination angle of the optical axis XX is 180° (ceiling-hung posture of FIG. 4B). In this state, the openings 25a and 25e face the air outlets P1a and P1b, respectively.

Figure 11A:
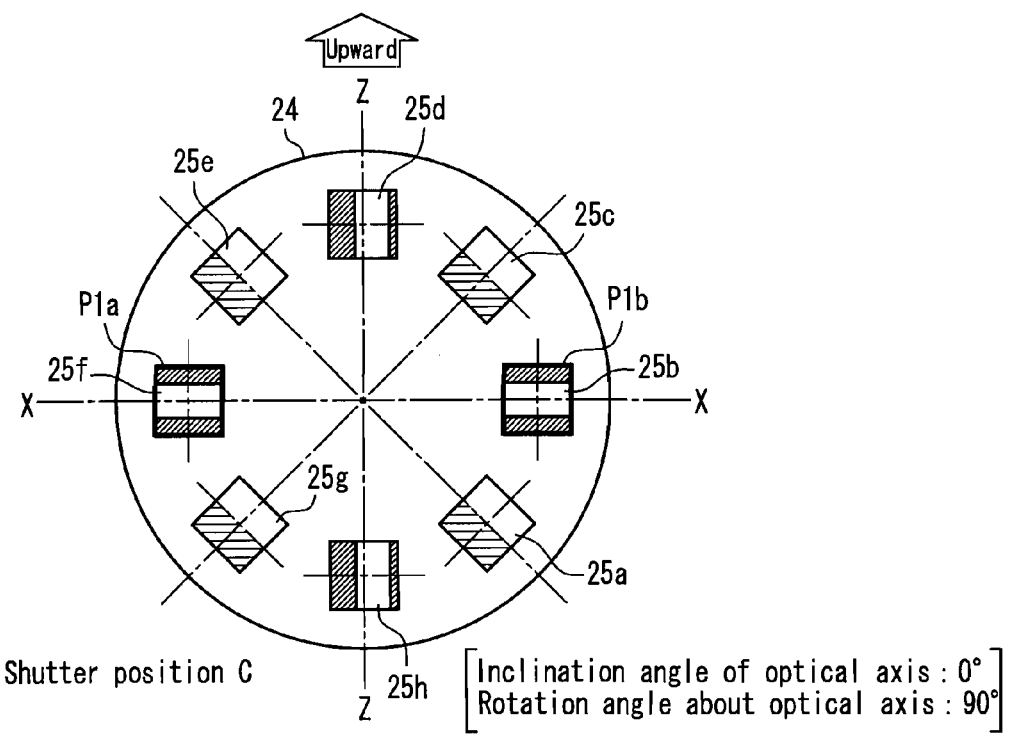
Figure 11B:
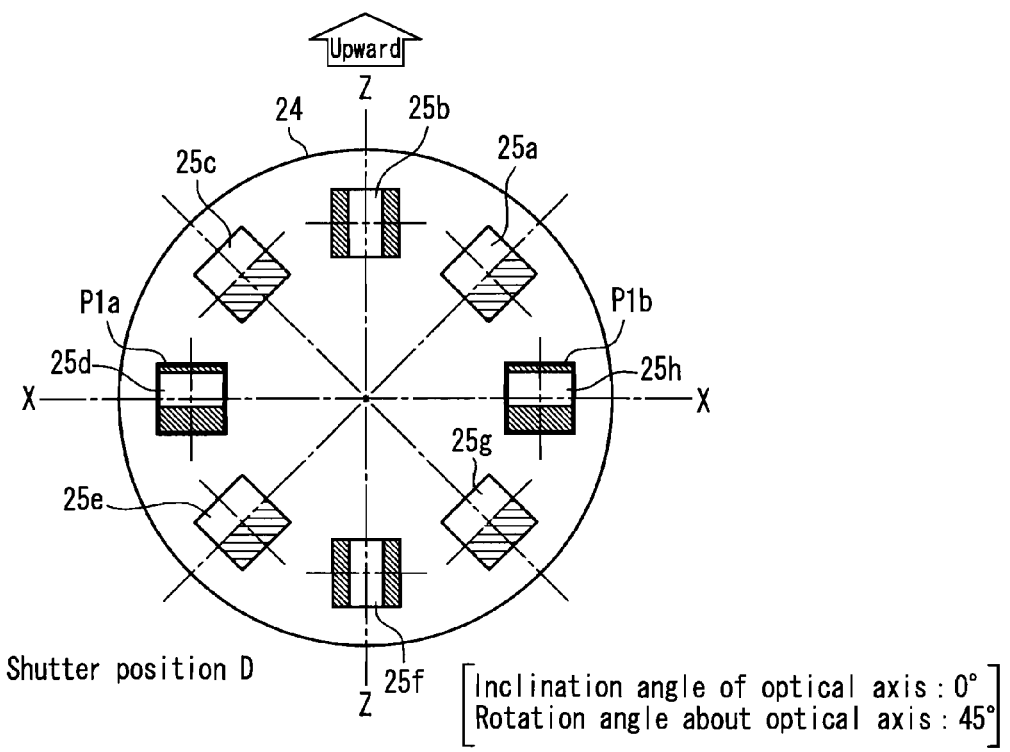

FIGS. 11A and 11B show the angle positions of the shutter 24 when the air outlets P1a and P1b are rotated about the optical axis XX. FIG. 11A shows a shutter position C, which is applied when the rotation angle about the optical axis XX is 90° and the air outlets P1a and P1b are in the XZ plane (horizontal plane) in FIG. 6, in other words, when the device is in the upward posture shown in FIG. 4C or in the downward posture shown in FIG. 4D. In this state, the openings 25f and 25d face the air outlets P1a and P1b, respectively. FIG. 11B shows a shutter position D, which is applied when the rotation angle about the optical axis XX is 45°. In this state, the openings 25d and 25h face the air outlets P1a and P1b, respectively.

Figure 12A:
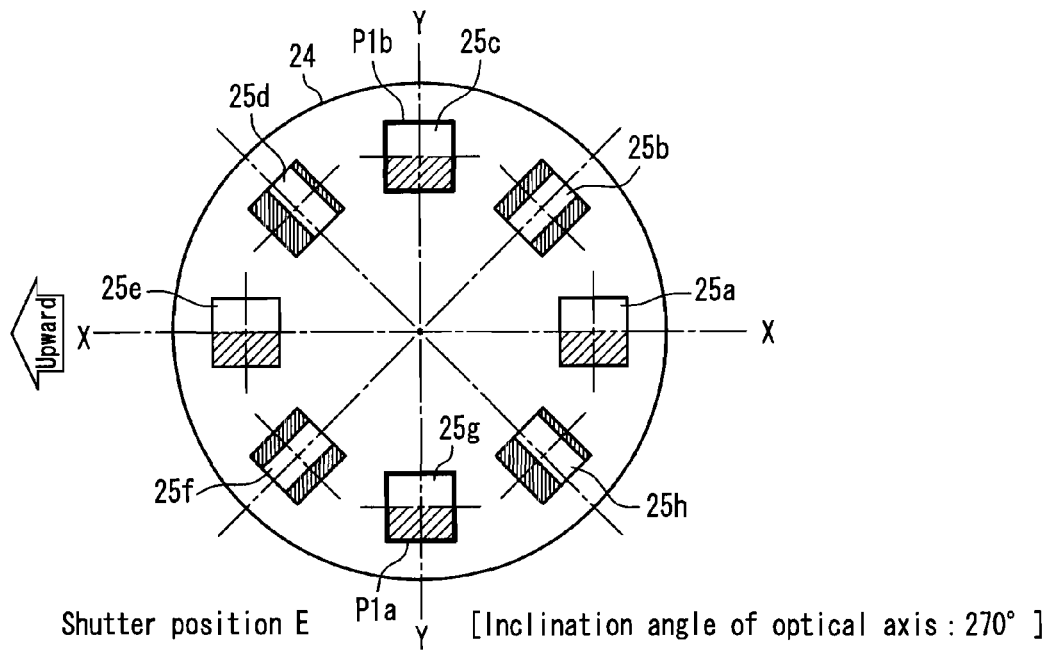
Figure 12B:
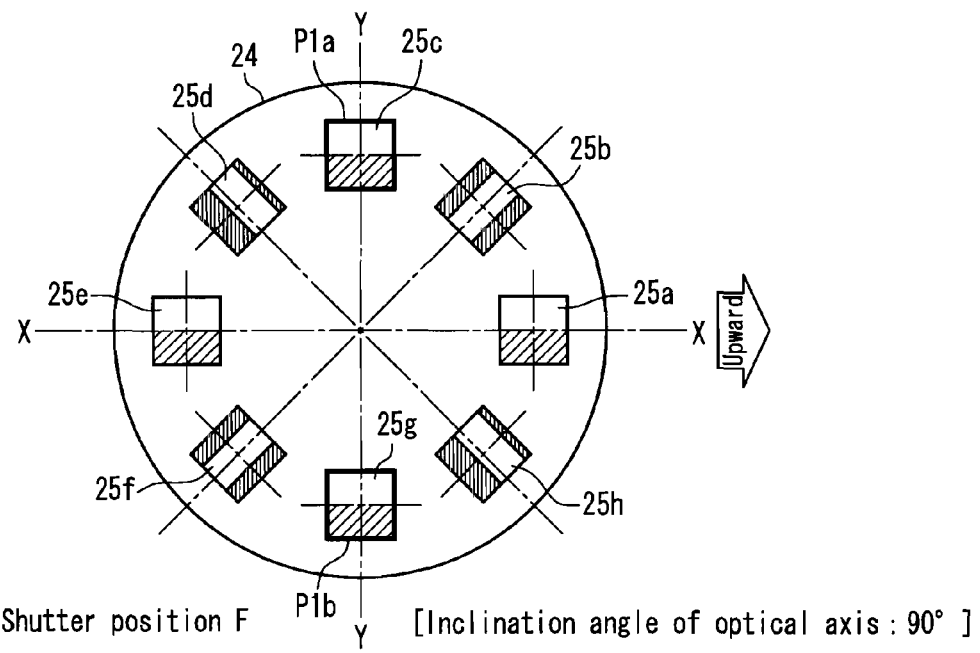

FIGS. 12A and 12B show the angle positions of the shutter 24 when the optical axis XX of the light source lamps 7a and 7b is inclined by 90° (when the device 1 is tilted towards the left or right when viewed from the front), in other words, when the device is rotated by 90° about the axis ZZ in FIG. 6. The air outlets P1a and P1b are rotated as well. FIG. 12A shows a shutter position E, which is applied when the rotation of the optical axis XX is anticlockwise (270°). In this state, the openings 25g and 25c face the air outlets P1a and P1b, respectively. FIG. 12B shows a shutter position F, which is applied when the rotation of the optical axis XX is clockwise. In this state, the openings 25c and 25g face the air outlets P1a and P1b, respectively.

Due to the configuration and functions as described above, in the device 1, when the light source units Ua and Ub respectively are cooled through the air outlets P1a and P1b from the side surface, cool air always is blown in towards the high temperature portions on the upper side. When the light source units Ua and Ub are cooled through the air outlets P1a and P1b from the top or bottom surface (horizontal plane), cool air is blown in from the center of the air outlets P1a and P1b intensively towards the high temperature portions of the light source units Ua and Ub. As a result, it is possible to increase the cooling efficiency.

Figure 13:
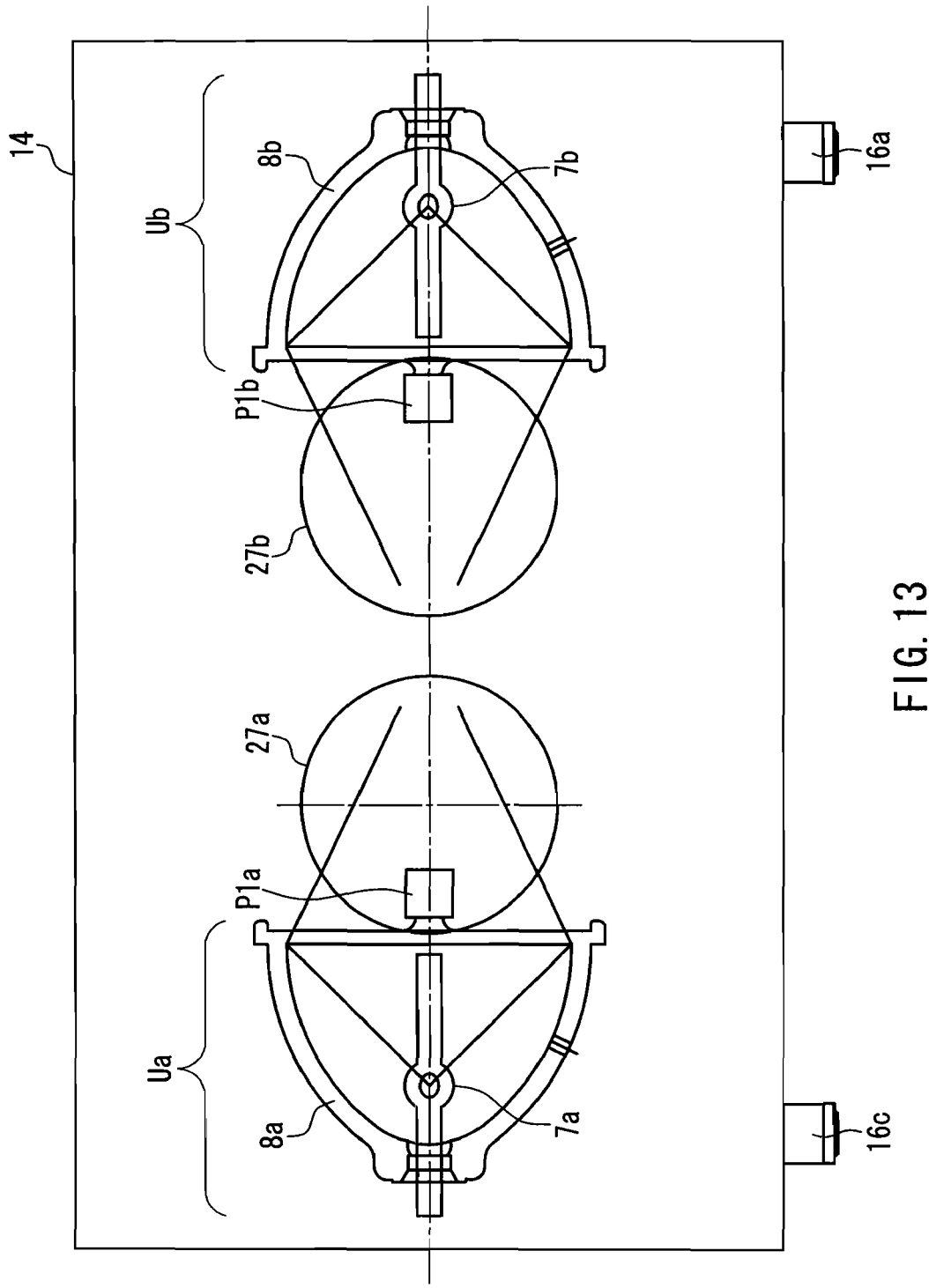
FIG. 13 is a front view showing partially in cross-section an applied example of the cooling control mechanism.
Figure 14A:
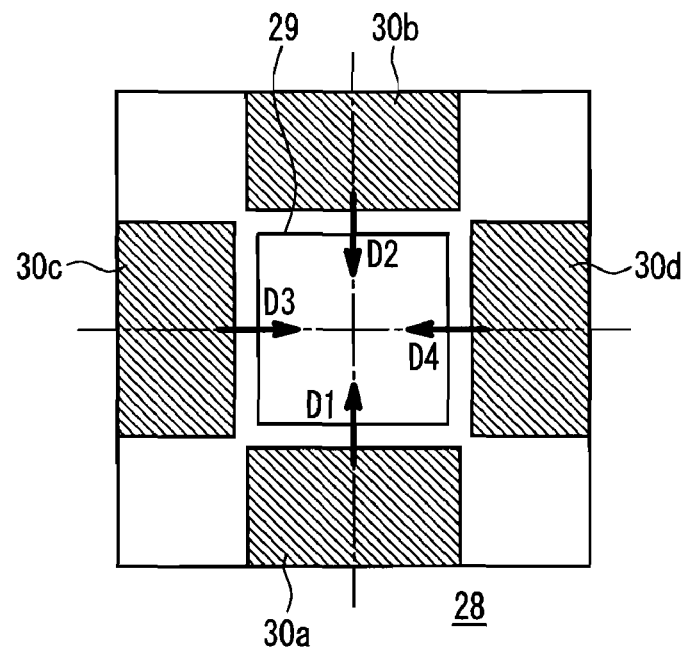
FIGS. 14A to 14E are front views each showing the operation of another example of the cooling control mechanism for the light sources of the projection type display device according to one embodiment of the present invention.
Figure 14B:
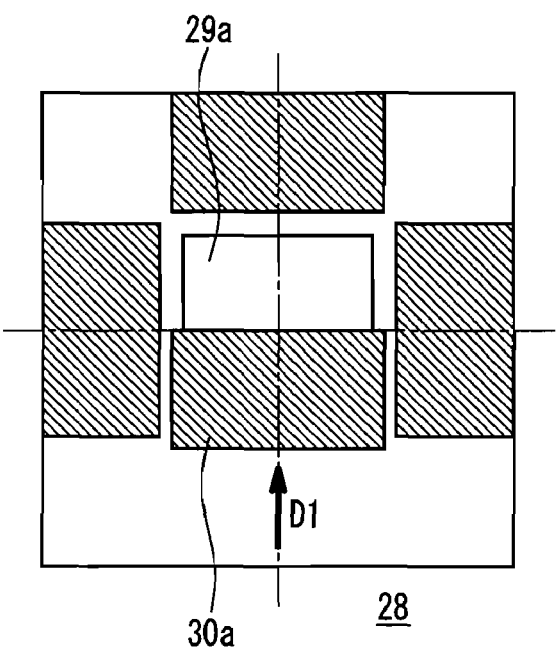
Figure 14C:
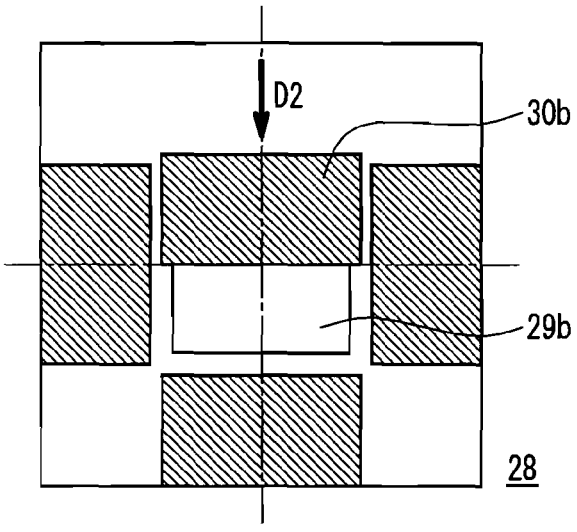
Figure 14D:
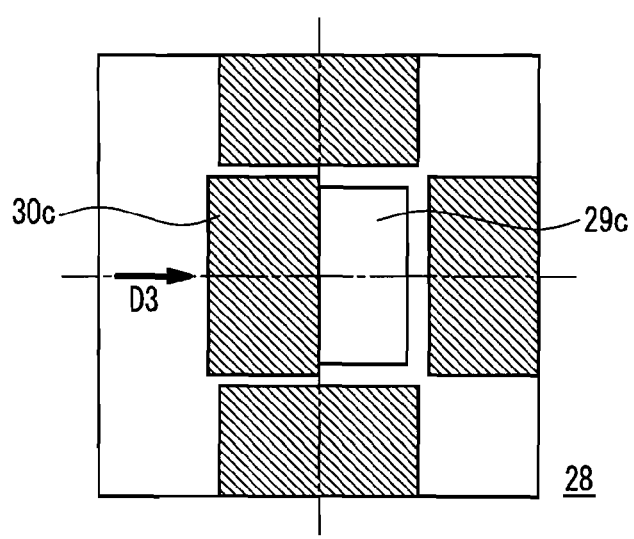
Figure 14E:
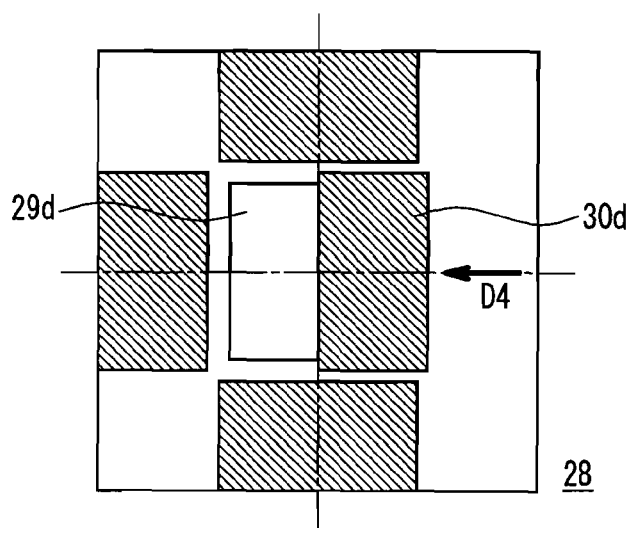

FIG. 13 shows another exemplary embodiment of the shutter 24. In this example, shutters 27a and 27b respectively are provided for the air outlets P1a and P1b of the pair of opposing light source units Ua and Ub. Because of this configuration, the size of each of the shutters 27a and 27b can be reduced, which can contribute to a reduction in size of the device 1.

FIGS. 14A to 14E show another example concerning the configuration of the shutter. In this example, sliding members 30a to 30d are provided for an air outlet 29 formed in a shutter 28. The sliding members 30a to 30d are respectively slidable in the directions indicated by the arrows D1 to D4. According to this configuration, by sliding the sliding members 30a to 30d in the directions indicated by the arrows D1 to D4 as shown in FIGS. 14B to 14E, openings 29a to 29d having different blow-off positions from each other can be formed.

Figure 15B:
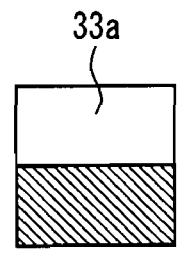
FIGS. 15B to 15E are front views each showing the operation of the cooling control mechanism.
Figure 15C:
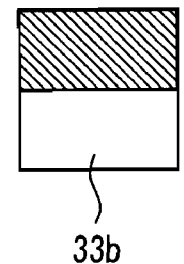
Figure 15D:
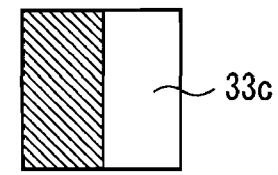
Figure 15E:
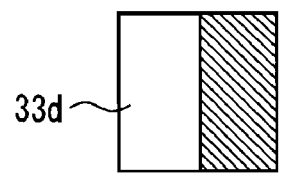

FIGS. 15A to 15E show yet another example concerning the configuration of the shutter. In this example, a shutter 31 is composed of flat plates 31a and 31b having the same size and shape and respectively including air outlets 32a and 32b as shown in FIG. 15A. At least one of the flat plates 31a and 31b is slidable in the directions indicated by the arrows E1 to E4. According to this configuration, by sliding the flat plate 31b in the direction indicated by any of the arrows E1 to E4, for example, openings 33a to 33d having different blow-off positions from each other can be formed as shown in FIGS. 15B to 15E.

Figure 16:
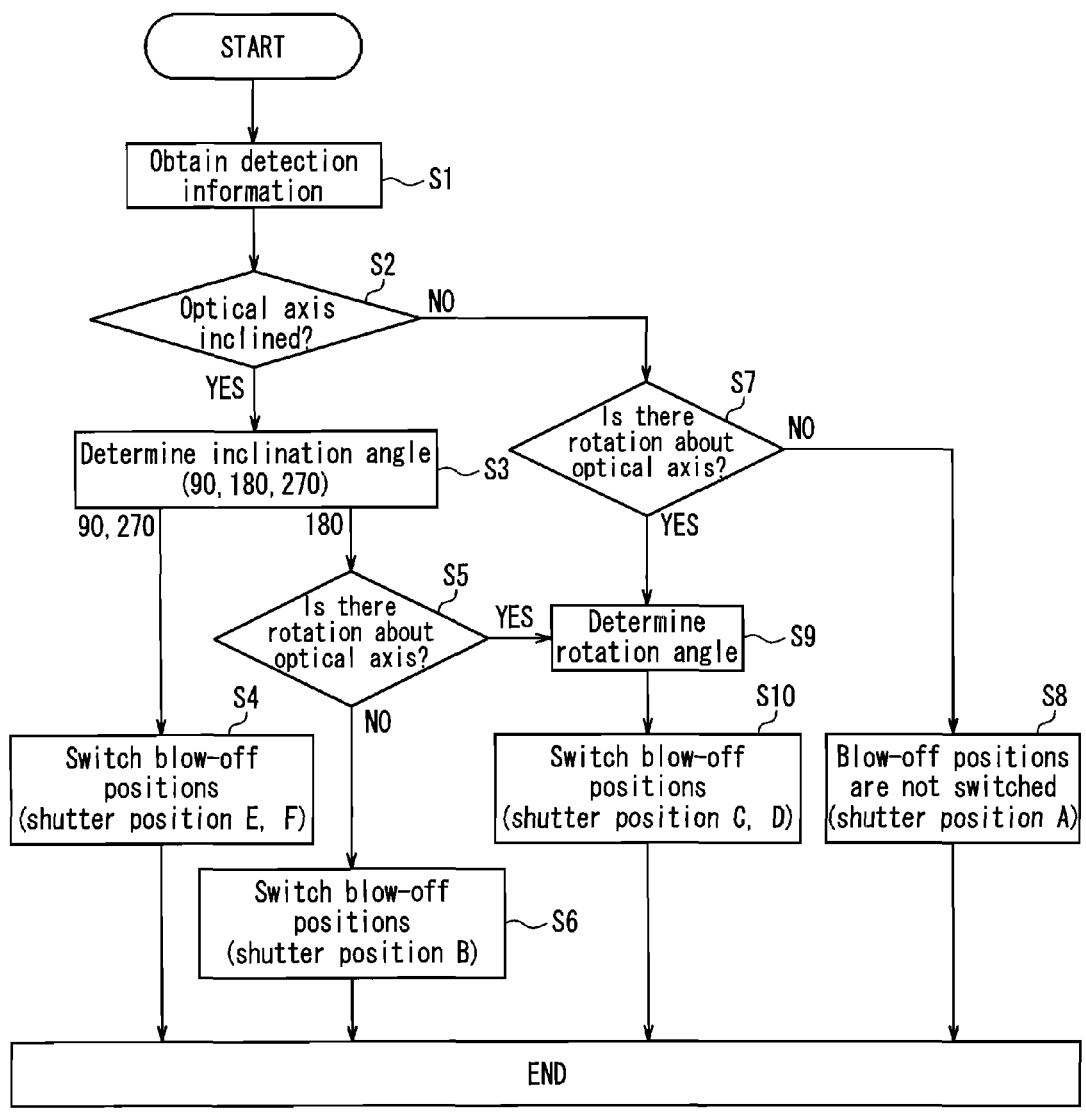
FIG. 16 is a flowchart showing steps of switching blow-off positions of the projection type display device according to one embodiment of the present invention.

Next, a process of switching the blow-off positions of the shutter will be described with reference to FIG. 16. FIG. 16 is a flowchart showing the process of switching the blow-off positions of the shutter 24 according to the present embodiment.

The device 1 includes a posture sensor (not shown) for detecting the installation posture of the device 1. The posture sensor is configured to detect two states: the inclination angle of the optical axis XX of the light source lamps (FIG. 6) and the rotation angle about the optical axis XX. In the device 1, the installation posture is determined on the basis of these two kinds of information, the rotation angle of the shutter 24 is decided and the blow-off positions are switched.

As shown in FIG. 16, when the process of switching cooling fan outlets starts, the device 1 obtains detection information from the posture sensor (step S1). Then, on the basis of the detection information, whether the optical axis XX of the light source lamps is inclined or not is determined (step S2). When it is determined that the optical axis is inclined in comparison with a predetermined threshold, the process goes to step S3.

At step S3, the inclination angle is classified as one of the four levels, 0, 90°, 180° or 270°. When the determination result is 90° or 270°, the process goes to steps S4 and the position of the shutter 24 is set to E (FIG. 12A) or F (FIG. 12B) and the blow-off positions are switched.

On the other hand, when the determination result at step S3 is 180°, the process goes to step S5 and whether there is a rotation about the optical axis XX or not is determined. When there is no rotation about the optical axis XX, the position of the shutter 24 is set to B (FIG. 10B) and the blow-off positions are switched (step S6).

When it is determined at step S2 that the optical axis XX of the light source lamps is not inclined, the process goes to step S7 and whether there is a rotation about the optical axis XX or not is determined. When there is no rotation about the optical axis XX, the process goes to step S8 and the blow-off positions are not switched and the position of the shutter 24 is set to A (FIG. 10A).

When it is determined at step S7 that there is a rotation about the optical axis XX, the process goes to step S9 and the rotation angle about the optical axis XX is determined. Subsequently, the process goes to step S10. At step S10, on the basis of the result of determining the rotation angle about the optical axis XX, C or D (FIG. 11A or 11B) is assigned to the position of the shutter 24.

When it is determined at step S5 that there is a rotation about the optical axis XX, the process goes to step S9 and thereafter, steps similar to those described above are taken.

When any of step S4, S6, S8 and S10 is performed, the process ends.

Figure 17:
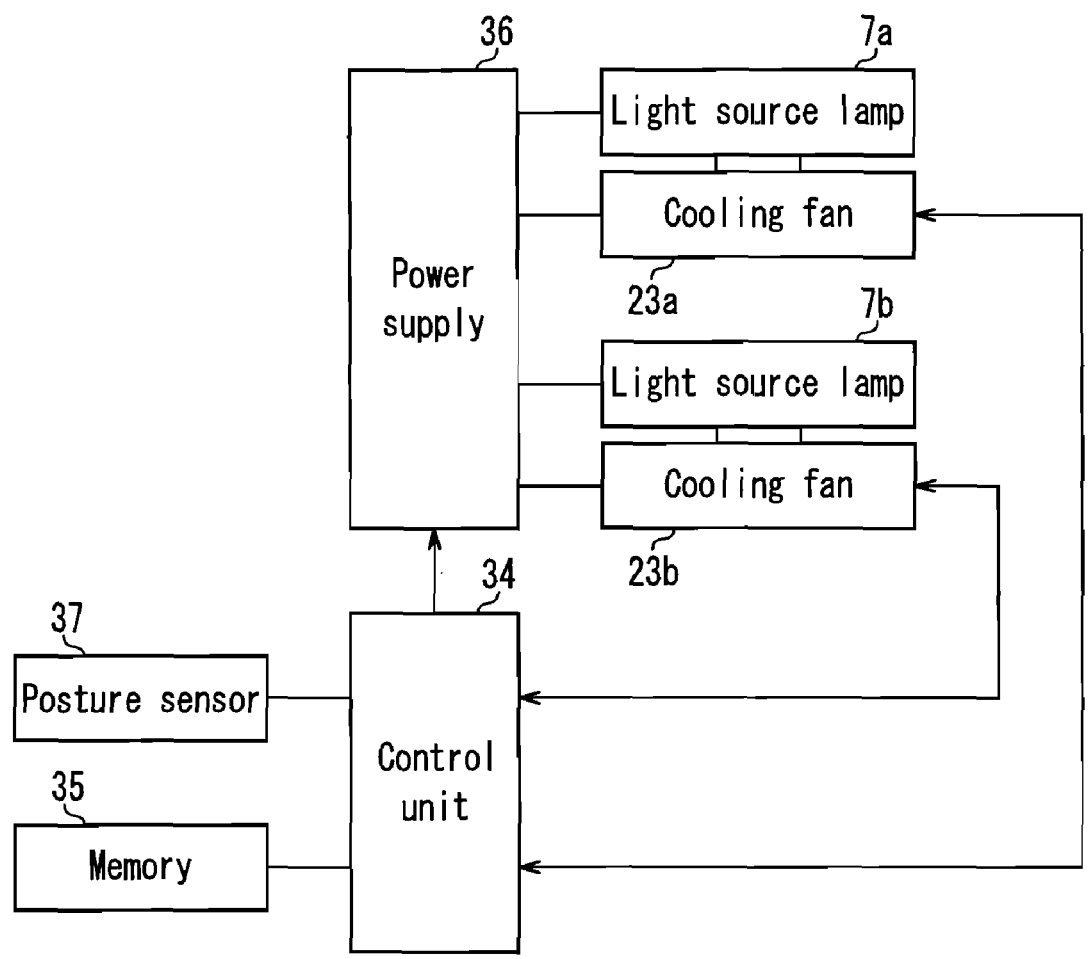
FIG. 17 is a block diagram showing a configuration directed to cooling control of the projection type display device.

Next, a configuration of the device 1 for carrying out the process of switching the blow-off positions of the shutter 24 and the function thereof will be described with reference to FIG. 17. FIG. 17 is a block diagram showing a configuration of the device 1 related to switching and controlling the blow-off positions of the shutter 24 in the present embodiment.

The device 1 includes a control unit 34 and a memory 35 for switching and controlling the blow-off positions of the shutter 24. The control unit 34 is connected so that it can control not only a power supply 36 that supplies power to the light source lamps 7a and 7b and the cooling fans 23a and 23b but also the operation of the cooling fans 23a and 23b. Further, the posture sensor 37 is connected to the control unit 34.

Each of the light source lamps 7a and 7b and the cooling fans 23a and 23b is connected independently to the power supply 36. Thus, the power supply 36 can drive and control all of the light source lamps 7a and 7b and the cooling fans 23a and 23b individually on the basis of instruction information received from the control unit 34.

The control unit 34 sends to the power supply 36 instruction information such as turning the power of the light source lamps 7a and 7b and the cooling fans 23a and 23b ON/OFF, a driving voltage, a driving current, ventilation control (flow rate control) and instructs driving control of all of the light source lamps 7a and 7b and the cooling fans 23a and 23b.

As described above, the posture sensor 37 has a function of detecting the installation posture of the device 1 and is capable of sending detection information to the control unit 34. The posture sensor 37 is placed on the interior of the cabinet 10 (FIG. 3A, etc.) of the device 1. A pressure-sensitive element or the like may be used for the component of the sensor.

In the memory 35, a control program, database and the like for determining the rotation angle of the shutter 24 on the basis of information received from the posture sensor 37 on the inclination angle of the optical axis XX of the light source lamps 7a and 7b and the rotation about the optical axis XX and switching the blow-off positions are stored in advance.

As described above, the device 1 includes: a plurality of light sources; a display device; a light-combining unit for combining output light beams from the plurality of light sources; a condensing unit for propagating an output light beam from the light-combining unit to the display device; a projecting unit for projecting an image with the use of an output light beam from the display device; and a cooling unit having a ventilating fan and disposed on each of the plurality of light sources. And the device 1 further includes a flow direction adjusting unit for switching blow-off positions where air from the fan is discharged and a control unit for controlling switching of the blow-off positions operated by the flow direction adjusting unit. The control unit controls the flow direction adjusting unit to switch the blow-off positions on the basis of posture information on at least one of an inclination angle of an optical axis of the plurality of light sources and a rotation angle about the optical axis.

Thus, even when the device 1 is installed in a state in which there is a rotation about the optical axis of the plurality of light sources and the optical axis is inclined, a change in the temperature distribution inside the light source unit can be appropriately handled by switching the blow-off positions where air from the fan is discharged. Consequently, the temperature of the light sources can be efficiently maintained within a predetermined range and problems, such as whitening of the light sources, life property degradation, blacking and brightness degradation can be suppressed, thereby providing a highly reliable projection type display device that can be used in a variety of purposes.

Further, the configuration of the present embodiment can be applied when at least a pair of light sources that share an optical axis is provided as the plurality of light sources. As a result, it is possible to achieve a compact and efficient projection type display device.

Further, by detecting at least the inclination angle of the optical axis of the plurality of light sources and the rotation angle about the optical axis with the use of the posture sensor (posture detecting unit), accurate and reliable control can be achieved efficiently.

Further, the switching of the blow-off positions can be performed with the angle being classified in to one of the four levels (e.g., 0, 90°, 180° or 270°). Thus, a device with practical functions can be achieved with the use of a simplified configuration.

Further, a shutter provided on an air outlet through which air from the fan is discharged and capable of switching a plurality of openings having different blow-off positions from each other can be used as the flow direction adjusting unit. Further, by using sliding members or a rotatable disc, a shutter with a simple structure can be configured and the positions of openings can be switched at the air outlet. As a result, it is possible to handle the change in the temperature distribution inside the light source unit promptly and reliably.

Further, by allowing the blow-off positions respectively disposed on the pair of opposing light sources to be switched at the same time with the use of the shutter, the configuration can be simplified.

Although a pair of two opposing light sources that share an optical axis is used in the present embodiment, a projection type display device can be configured on the basis of a similar idea even when two or more pairs of two opposing light sources or three or more light sources are included.

As described above, according to the configuration of the present invention, it is possible to manage with certainty the temperature of light sources of a projection type display device using a plurality of light sources. Thus, deterioration and decrease of life of the light source are less likely to occur. Therefore, the present invention is useful for a projection type display device, such as a projector, for which high reliability in a variety of installation postures is required.

What is claimed is:

1. A projection type display device comprising:
   a plurality of light sources;
   a display device;
   a light-combining unit for combining output light beams from the plurality of light sources;
   a condensing unit for propagating an output light beam from the light-combining unit to the display device;
   a projecting unit for projecting an image with the use of an output light beam from the display device; and
   a cooling unit having a ventilating fan and disposed on each of the plurality of light sources,
   wherein the projection type display device further comprises
   a flow direction adjusting unit for switching blow-off positions where air from the fan is discharged, and
   a control unit for controlling switching of the blow-off positions operated by the flow direction adjusting unit, and
   the control unit controls the flow direction adjusting unit to switch the blow-off positions on the basis of posture information on at least one of an inclination angle of an optical axis of the plurality of light sources and a rotation angle about the optical axis.

2. The projection type display device according to claim 1, wherein the plurality of light sources include at least a pair of opposing light sources that share the optical axis, and
   the control unit controls the flow direction adjusting unit disposed on the opposing light sources to switch the blow-off positions on the basis of the posture information on at least one of the inclination angle of the optical axis of the opposing light sources and the rotation angle about the optical axis.

3. The projection type display device according to claim 1, further comprising a posture detecting unit for detecting at least one of the inclination angle of the optical axis of the plurality of light sources and the rotation angle about the optical axis,
   wherein the control unit switches the blow-off positions on the basis of information outputted from the posture detecting unit.

4. The projection type display device according to claim 3, wherein the posture detecting unit detects at least one of the inclination angle of the optical axis and the rotation angle about the optical axis according to four steps classified by levels of 0, 90°, 180° and 270°.

5. The projection type display device according to claim 1, wherein the flow direction adjusting unit is provided on an air outlet through which air from the fan is discharged and is composed of a shutter that can switch a plurality of openings corresponding to different blow-off positions from each other.

6. The projection type display device according to claim 5, wherein the shutter is configured in such a manner that the openings are switched by displacement of sliding members.

7. The projection type display device according to claim 5, wherein the shutter is composed of a rotatable disc.

8. The projection type display device according to claim 7, wherein the blow-off positions respectively disposed on the pair of opposing light sources can be switched at the same time by the shutter.

* * * * *